(12) United States Patent
Banger et al.

(10) Patent No.: US 12,424,744 B2
(45) Date of Patent: Sep. 23, 2025

(54) SYSTEMS AND METHODS OF NONLINEAR RF BEAMFORMING

(71) Applicant: Lockheed Martin Corporation, Bethesda, MD (US)

(72) Inventors: Sean Christopher Banger, Marlton, NJ (US); Mauro Joseph Sanchirico, III, Marlton, NJ (US); Brandon Scott Liston, Shelton, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 332 days.

(21) Appl. No.: 18/305,462

(22) Filed: Apr. 24, 2023

(65) Prior Publication Data

US 2023/0344124 A1    Oct. 26, 2023

Related U.S. Application Data

(60) Provisional application No. 63/334,351, filed on Apr. 25, 2022.

(51) Int. Cl.
*H01Q 3/36* (2006.01)
(52) U.S. Cl.
CPC ..................... *H01Q 3/36* (2013.01)
(58) Field of Classification Search
CPC ........................................................ H01Q 3/36
USPC ......................................................... 342/368
See application file for complete search history.

(56) References Cited

U.S. PATENT DOCUMENTS

| | | |
|---|---|---|
| 6,473,362 B1 | 10/2002 | Gabbay |
| 7,103,119 B2 | 9/2006 | Matsuoka et al. |
| 7,385,955 B2 | 6/2008 | Deng et al. |
| 8,619,927 B2 | 12/2013 | Kludt et al. |
| 10,340,583 B2 | 7/2019 | Barker et al. |
| 10,624,612 B2 | 4/2020 | Sumi et al. |
| 10,771,145 B2 | 9/2020 | Buehler |

(Continued)

FOREIGN PATENT DOCUMENTS

| | | |
|---|---|---|
| CN | 102664666 A | 9/2012 |
| EP | 3462620 A1 | 4/2019 |

(Continued)

*Primary Examiner* — William Kelleher
*Assistant Examiner* — Samarina Makhdoom
(74) *Attorney, Agent, or Firm* — Baker Botts L.L.P.

(57) ABSTRACT

According to some embodiments, a method of nonlinear RF beamforming includes receiving a reference RF signal and computing linear beamformed signals. The method further includes determining a frequency content for each of the plurality of linear beamformed signals, determining a reduced subset of linear beamformed signals, and computing a minimum element-wise magnitude across the reduced subset of linear beamformed signals. The method further includes computing a FFT of a reference channel signal, computing an amplitude mask ratio between the minimum element-wise magnitude and the FFT of the reference channel signal, and applying a learned polynomial response to the amplitude mask ratio to create a modified amplitude mask. The method further includes applying the modified amplitude mask to the FFT of the reference channel signal to create a masked frequency response of the reference channel signal and computing an inverse FFT in order to generate a final beamformed signal.

20 Claims, 3 Drawing Sheets

(56) References Cited

U.S. PATENT DOCUMENTS

| | | |
|---|---|---|
| 11,152,699 B2 | 10/2021 | Tervo et al. |
| 2009/0239551 A1* | 9/2009 | Woodsum ................ H04B 7/26 342/377 |
| 2017/0250468 A1* | 8/2017 | Cherubini .............. H04B 7/086 |
| 2019/0288764 A1* | 9/2019 | Zirwas ................ H04B 7/0857 |
| 2019/0331794 A1 | 10/2019 | Chernyakova et al. |
| 2021/0143543 A1* | 5/2021 | Wyckoff ................ H04B 7/086 |

FOREIGN PATENT DOCUMENTS

| | | | |
|---|---|---|---|
| IN | 201941046642 | 6/2021 | |
| WO | WO-2022039303 A1 * | 2/2022 | ............. H01Q 1/273 |

* cited by examiner

SYSTEMS AND METHODS OF NONLINEAR RF BEAMFORMING

PRIORITY

This application claims the benefit, under 35 U.S.C. § 119(e), of U.S. Provisional Patent Application No. 63/334,351, filed 25 Apr. 2022, which is incorporated herein by reference in its entirety.

TECHNICAL FIELD

This disclosure generally relates to beamforming, and more specifically to systems and methods of nonlinear radio frequency (RF) beamforming.

BACKGROUND

Beamforming is the act of filtering a received wireless signal (e.g., a radio frequency (RF) signal) such that signals received from certain directions are amplified while signals received from other directions are attenuated. RF systems have traditionally performed beamforming using linear methods such as delay-and-sum beamforming and filter-and-sum beamforming. The beam shapes attainable with these approaches are limited, especially in small-array systems with limited coherent receive channels.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Figure 1:
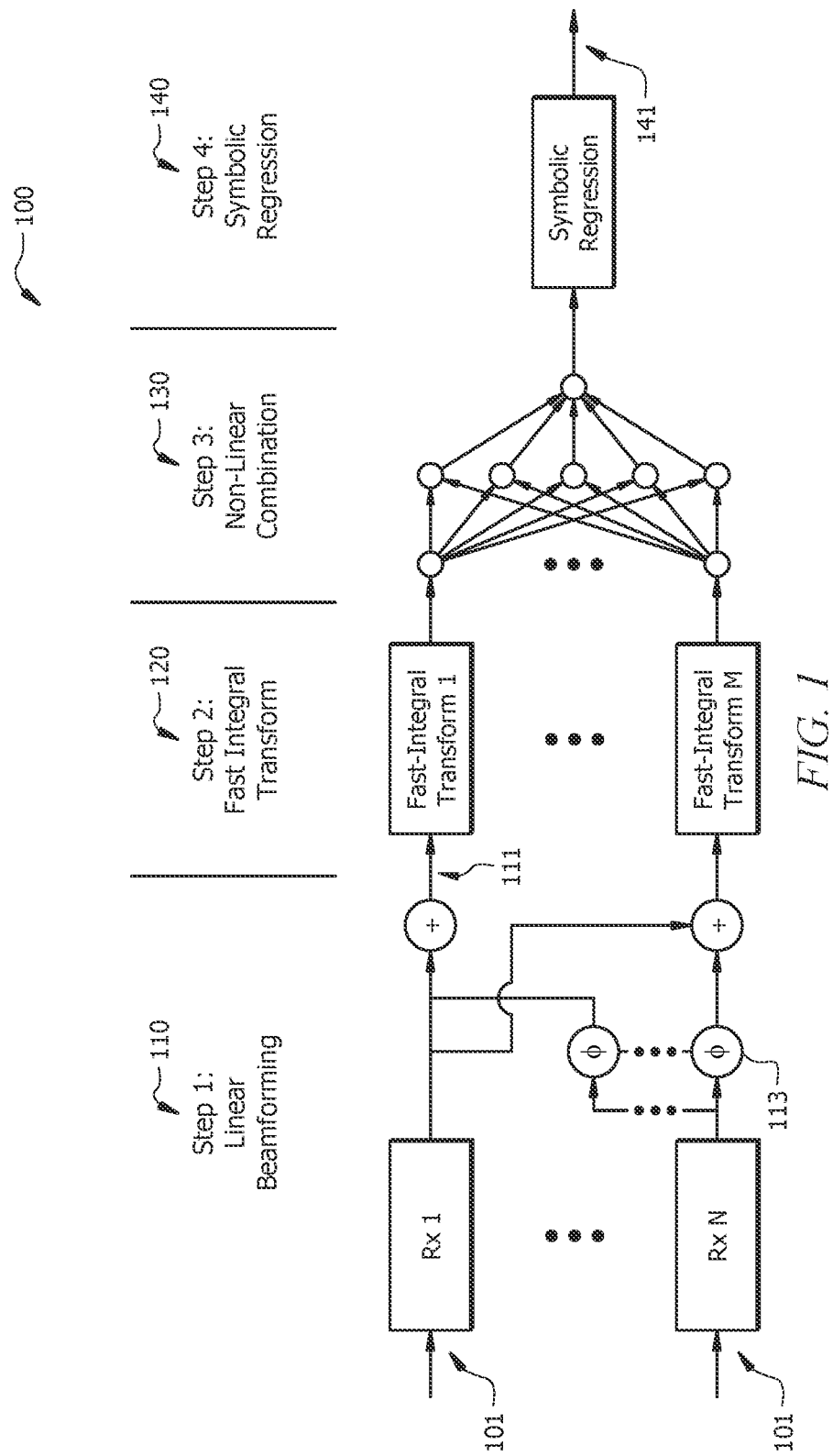
FIG. 1 is a diagram illustrating a nonlinear RF beamforming system, according to particular embodiments.

The present disclosure relates generally to systems and methods for nonlinear radio frequency (RF) beamforming. According to one or more embodiments of the disclosure, a method of nonlinear RF beamforming includes receiving multiple channels of RF signals, designating one channel as the reference RF channel, and computing a plurality of linear beamformed signals using the reference RF channel. The method further includes determining a frequency content for each of the plurality of linear beamformed signals (e.g., using the fast Fourier transform (FFT)), determining a reduced subset of linear beamformed signals from the plurality of linear beamformed signals, and computing a minimum element-wise magnitude across the reduced subset of linear beamformed signals. The method further includes computing the FFT of the reference channel signal, computing an amplitude mask ratio between the minimum element-wise magnitude across the reduced subset of linear beamformed signals (in the frequency domain) and the FFT of the reference channel signal, and applying a learned polynomial response to the amplitude mask ratio to create a modified amplitude mask. The method further includes applying the modified amplitude mask to the FFT of the reference channel signal to create a masked frequency response of the reference channel signal and computing an inverse FFT of the masked frequency response of the reference channel signal in order to generate a final beamformed signal. Other embodiments are described below, and this overview is not meant to limit the scope of the present disclosure.

Technical advantages of certain embodiments of this disclosure may include one or more of the following. Certain systems and methods described herein provide systems and methods for nonlinear RF beamforming. The disclosed embodiments provide the ability to generalize over a wide range of RF frequencies and modulation types due to the use of learned signal processing and an efficient architecture. The disclosed embodiments use an efficient architecture that may be used on edge systems where more resource-intensive architectures would not be applicable. The disclosed embodiments enable better generalization with a reduced training data set when compared to generic deep learning architectures of other typical systems. The disclosed embodiments may use global optimization algorithms (e.g., genetic algorithms) to simultaneously learn phase offsets, nonlinear combination, and symbolic regression for creating a narrower beam than possible with a linear beamformer. The disclosed embodiments use symbolic regression to increase gain in-beam while simultaneously reducing side-lobes. The disclosed embodiments may be adapted for new applications faster than typical systems due to the use of learned signal processing throughout the entire architecture. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure relates generally to providing nonlinear RF beamforming. RF systems have traditionally performed beamforming using linear methods such as delay-and-sum beamforming and filter-and-sum beamforming. The beam shapes attainable with these approaches are limited, especially in small-array systems with limit coherent receive channels. Many approaches focus generically on removing noise from reverberant environments rather than separating signals arriving from different steering angles. The goal for general RF beamforming is increasing the angular resolution of a beam while both simultaneously limiting the amount of distortion applied to the signal and limiting any reduction in SNR. The angular resolution problem is exacerbated for systems that have a limited number of coherent receive channels.

To address these and other problems with RF beamforming, systems and methods for nonlinear beamforming are disclosed that can be applied to any RF signal regardless of frequency band and that can produce higher angular resolution than possible with traditional linear beamformers. Certain disclosed embodiments utilize a neural network architecture that non-linearly combines multiple linear beamformers using fast-integral transforms, nonlinear activations, and symbolic regression to narrow the beam. The symbolic regression layer not only further narrows the beam by reducing side-lobes, the symbolic regression layer also increases the gain in-beam. The disclosed embodiments provide a framework for building a nonlinear beamformer from linear beamformers. For example, the symbolic regression layer of the disclosed embodiments could span any number of learned functions from learned polynomial coefficients to a neural network depending on the application and target platform.

Figure 2:
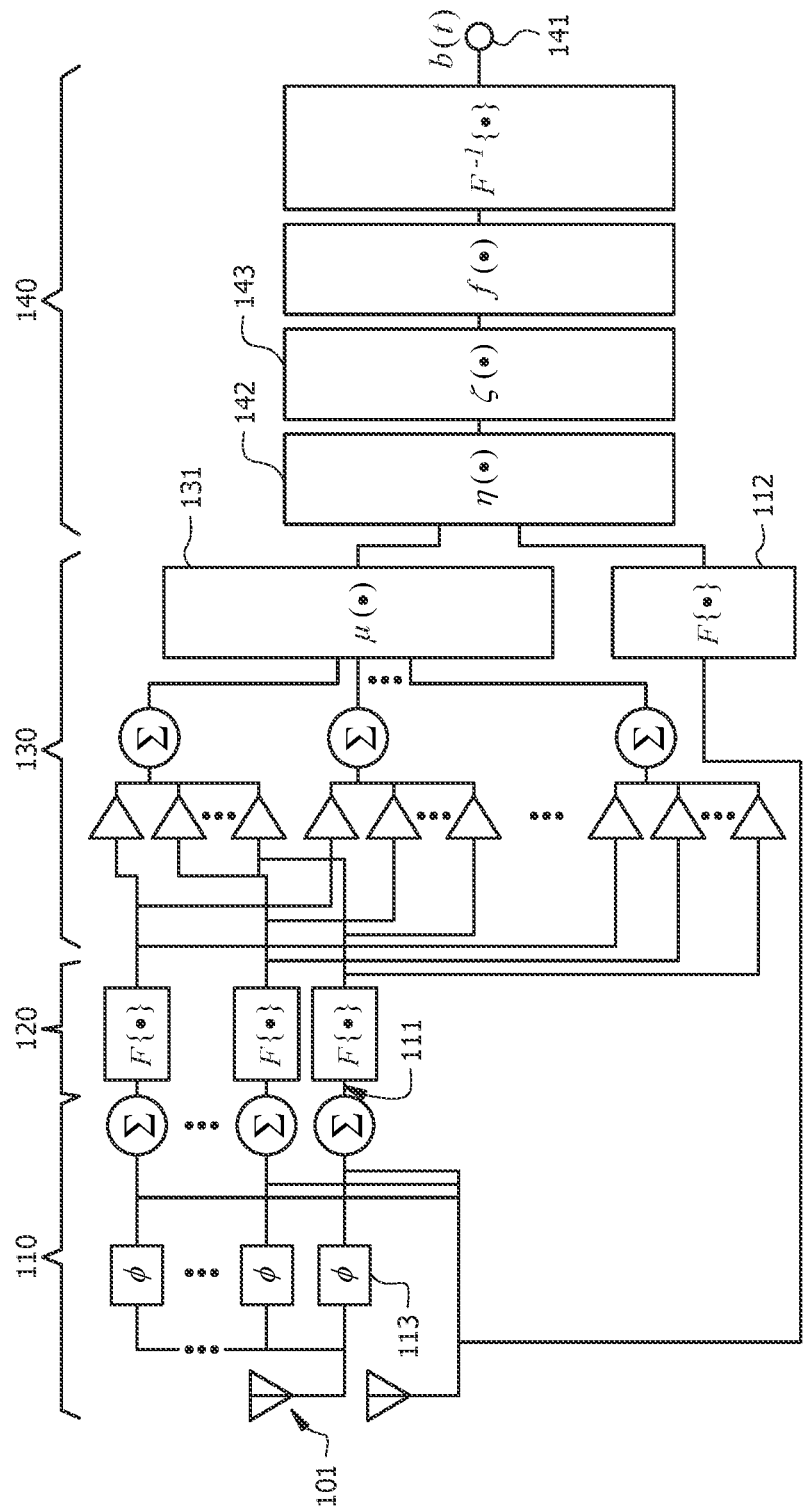
FIG. 2 is a diagram illustrating more details of the nonlinear RF beamforming system of FIG. 1, according to particular embodiments.

Certain embodiments will now be discussed in reference to FIGS. 1 and 2. FIG. 1 is a diagram illustrating a nonlinear RF beamforming system 100 and FIG. 2 is a diagram illustrating specific details of the nonlinear RF beamforming system 100 of FIG. 1, according to particular embodiments. In general, nonlinear RF beamforming system 100 utilizes a linear beamforming step 110, a frequency transformation step 120, a nonlinear combination step 130, and a symbolic regression step 140 to linearly beamform a received RF signal 101 into a final beamformed signal 141. Specific details about each of these steps 110-140 are discussed in more detail below.

Nonlinear RF beamforming system 100 provides a method of nonlinear RF beamforming that enables an improved ability to narrow a beam over traditional linear beamforming methods. In traditional linear beamforming systems, such as linear delay-and-sum beamforming, phase shifts and gains are applied to each receive channel prior to linearly combining the channels (e.g., by summation). The disclosed embodiments, however, non-linearly combine multiple linear beamformers and use symbolic regression to narrow the beam. The first step in this beamformer is linear beamforming step 110. In linear beamforming step 110, nonlinear RF beamforming system 100 computes a certain number of unique linear beamformers across all receive channels. In some embodiments, the number of linear beamformers is user-defined. In some embodiments, the number of beams is considered a hyperparameter in a neural network architecture. The outputs of linear beamforming step 110 are linear beamformed signals 111. In some embodiments, linear beamforming step 110 utilizes delay and sum beamforming and a plurality of different phase shifts 113.

Frequency transformation step 120 determines a frequency content for each of the linear beamformed signals 111 produced in linear beamforming step 110. In some embodiments, linear beamformed signals 111 are processed through a fast-integral transform layer in frequency transformation step 120 in order to break down the signal into frequency components. In other embodiments, frequency transformation step 120 utilizes fast Fourier transforms (FFTs).

The minimalistic architecture of the disclosed embodiments (e.g., for reduced memory consumption) can use a complex FFT as the fast-integral transform layer. In other embodiments, other possible solutions such as fast integral transforms may be employed. These embodiments would enhance separability in cases where multiple emitters are expected to occupy the same FFT bins. While emitters in overlapping frequency bands can be separated, separability may be further enhanced by employing alternative integral transforms which place emitters further from each other in the resulting alternative time-frequency representations than they would be in the typical FFT bins. For example, linear canonical transforms could be employed to further enhance separability on chirps. Further, custom integral transforms, implemented through an additional neural network layer which serves as the kernel of the transform, can be employed. These transforms could be learned by multiplying the discrete time vector by an independent variable of integration, passing the result through a neural network layer, and then further multiplying the output of the neural network by the original signal and integrating the result. The final multiply and integrate is a linear operation on the elements of the signal and as such preserves the gradients and allows this step to be learned.

Nonlinear combination step 130 is utilized by nonlinear RF beamforming system 100 after frequency transformation step 120 in order to reduce the number of linear beamformed signals 111 by using a neural network of fully-connected layers and nonlinear activation function(s). In some embodiments, nonlinear combination step 130 may use a single fully connected layer and a naive set of linear beamformers that may not all be relevant to the angular region of interest. The reduction layer serves to reduce the original set of linear beamformers down to the relevant subset of linear beamformers based on the input receive signal and the user-defined angular region of interest. The reduction size from the number of linear beamformers can also be considered a hyperparameter (assumed to be less than or equal to the number of original linear beamformer inputs).

After utilizing a channel reduction layer to reduce the linear beams, nonlinear combination step 130 may then feed the result to a minimization function block 131. Minimization function block 131 combines the transformed beams nonlinearly by extracting the magnitude of each beam and then computing an element-wise minimum across the magnitude to compute an attenuation factor. The transformed beams are represented in the frequency domain and directly describe the frequency content of the signal. For each frequency bin the minimum magnitude is computed, where only the intersection of all reduced linear beamformers is output. An attenuation factor may be computed at the epsilon offset (to prevent division by zero) by taking the ratio of the nonlinearly combined beam (FFT) vs. the FFT of an input channel (i.e., reference channel 112). As such, the gain of the single complex signal is computed relative to a reference receive channel and is used as an input to symbolic regression step 140.

In symbolic regression step 140, the neural network learns the coefficients to a polynomial function and applies the polynomial to the gain. The learned polynomial reshapes the gain curve such that out-of-beam frequency components are further attenuated, and in-beam frequency components are amplified. The processed gain is then applied back to the input signal. The polynomial adjusted signal is then transformed back to the time domain to form the beamformer output. In a given embodiment, this transformation back to the time domain could be computed using the inverse FFT.

The disclosed embodiments may be naively trained via stochastic gradient descent (SGD). One of the benefits of this framework is that there are embodiments that allow for the integration of deep learning. For example, some embodiments include learned layers during the nonlinear combination and symbolic regression layers that may be trained using any common deep learning framework. The learned layers may be trained using any optimizer built for deep learning. In certain embodiments, synthetic data may be generated with one or more signals in-beam and one or more signals out-of-beam and the optimizer minimizes the difference between the summation of all in-beam signals with the output of the beamformer. In-beam signals are defined as signals that occupy the angular region of interest (e.g., a hyperparameter) and out-of-beam signals are defined as signals that occupy angular regions outside of the region of interest. One issue with training via this method, however, is that there are an infinite number of local minima with unbounded phase shifts. This problem may be mitigated by using a genetic algorithm (such as population-based training) to select the values of these phase shifts (in addition to the other weights in the network). In other embodiments, other linear beamforming methods can be employed in the first layer of the network such as, but not limited to, filter-and-sum beamforming or multiple signal classification (MUSIC). In other embodiments still, a variety of other fast-integral transform layers can be employed, such as fractional transforms, linear canonical transforms, wavelet transforms, multi-resolution transforms, and learned custom transforms.

Figure 3:
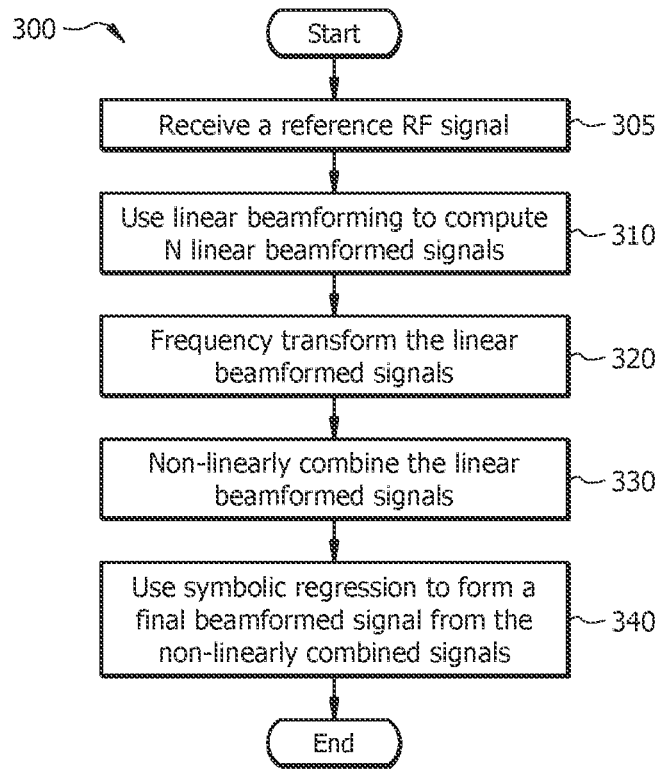
FIG. 3 illustrates an example method for providing nonlinear RF beamforming, in accordance with certain embodiments.

FIG. 3 is a flow diagram illustrating an example method 300 for providing nonlinear RF beamforming. Method 300 may begin in step 305 where method 300 receives a reference RF signal. In some embodiments, the reference RF signal is received RF signal 101. In some embodiments, the reference RF signal is received by an RF receiver or transceiver.

At step 310, method 300 uses linear beamforming to compute N linear beamformed signals using the reference RF signal of step 305. In some embodiments, step 310 corresponds to linear beamforming step 110. In some embodiments, step 310 includes using delay and sum beamforming and a plurality of different phase shifts such as phase shift 113. The output of step 310 is linear beamformed signals such as linear beamformed signals 111.

At step 320, method 300 frequency transforms the linear beamformed signals of step 310. In some embodiments, step 320 corresponds to frequency transformation step 120. In general, this step determines a frequency content for each of linear beamformed signals of step 310. In some embodiments, step 320 includes using performing FFT. In other embodiments, step 320 includes performing fast integral transforms.

At step 330, method 300 non-linearly combines the linear beamformed signals of step 320. In some embodiments, step 330 corresponds to nonlinear combination step 130. In some embodiments, step 330 includes determining a reduced subset of linear beamformed signals from the linear beamformed signals. In some embodiments, determining the reduced subset of linear beamformed signals includes using a neural network. In some embodiments, the neural network includes a plurality of fully-connected layers and a plurality of nonlinear activation functions.

In some embodiments, step 330 additionally includes computing a minimum clement-wise magnitude across the reduced subset of linear beamformed signals. This may involve using a minimization function block such as minimization function block 131. Also in step 330, method 300 computes an FFT of a reference channel signal such as reference channel 112.

At step 340, method 300 uses symbolic regression to form a final beamformed signal from the non-linearly combined signals of step 330. In some embodiments, step 340 corresponds to symbolic regression step 140. In some embodiments, the final beamformed signal of step 340 is final beamformed signal 141. In some embodiments, step 340 includes computing an amplitude mask ratio between the minimum element-wise magnitude of step 330 and the FFT of the reference channel signal of step 330. In some embodiments, this is performed by amplitude mask 142. In addition, method 300 may apply a learned polynomial response to the amplitude mask ratio to create a modified amplitude mask in step 340 and then apply the modified amplitude mask to the FFT of the reference channel signal to create a masked frequency response of the reference channel signal. This may be performed by adjusted amplitude mask 143. Next, method 300 may compute an inverse FFT of the masked frequency response of the reference channel signal in order to generate a final beamformed signal. In some embodiments, step 340 includes outputting the final beamformed signal using an RF transmitter or transceiver. After step 340, method 300 may end.

Figure 4:
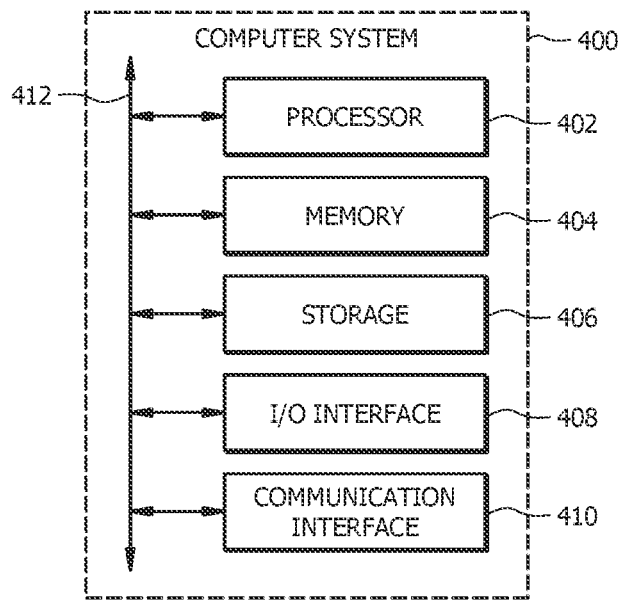
FIG. 4 illustrates an example of a computer system, in accordance with certain embodiments.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may cach include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single- ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A system comprising:
one or more memory units; and
a processor communicatively coupled to the one or more memory units, the processor configured to:
  receive a reference radio frequency (RF) signal;
  compute a plurality of linear beamformed signals using the reference RF signal;
  determine a frequency content for each of the plurality of linear beamformed signals;
  determine a reduced subset of linear beamformed signals from the plurality of linear beamformed signals;
  compute a minimum element-wise magnitude across the reduced subset of linear beamformed signals;
  compute a fast Fourier transform (FFT) of a reference channel signal;
  compute an amplitude mask ratio between the minimum element-wise magnitude and the FFT of the reference channel signal;
  apply a learned polynomial response to the amplitude mask ratio to create a modified amplitude mask;
  apply the modified amplitude mask to the FFT of the reference channel signal to create a masked frequency response of the reference channel signal; and
  compute an inverse FFT of the masked frequency response of the reference channel signal to generate a final beamformed signal.

2. The system of claim 1, wherein computing the plurality of linear beamformed signals using the reference RF signal comprises using:
delay and sum beamforming; and
a plurality of different phase shifts.

3. The system of claim 1, wherein determining the frequency content for each of the plurality of linear beamformed signals comprises:
   performing FFT; or
   performing fast integral transforms.

4. The system of claim 1, wherein determining the reduced subset of linear beamformed signals from the plurality of linear beamformed signals comprises using a neural network.

5. The system of claim 4, wherein the neural network comprises:
   a plurality of fully-connected layers; and
   a plurality of nonlinear activation functions.

6. The system of claim 4, wherein an amount of signals in the reduced subset of linear beamformed signals is a hyperparameter in the neural network.

7. The system of claim 1, wherein applying the learned polynomial response to the amplitude mask ratio to create the modified amplitude mask comprises using a neural network.

8. A method by a computing system, the method comprising:
   receiving a reference radio frequency (RF) signal;
   computing a plurality of linear beamformed signals using the reference RF signal;
   determining a frequency content for each of the plurality of linear beamformed signals;
   determining a reduced subset of linear beamformed signals from the plurality of linear beamformed signals;
   computing a minimum element-wise magnitude across the reduced subset of linear beamformed signals;
   computing a fast Fourier transform (FFT) of a reference channel signal;
   computing an amplitude mask ratio between the minimum element-wise magnitude and the FFT of the reference channel signal;
   applying a learned polynomial response to the amplitude mask ratio to create a modified amplitude mask;
   applying the modified amplitude mask to the FFT of the reference channel signal to create a masked frequency response of the reference channel signal; and
   computing an inverse FFT of the masked frequency response of the reference channel signal to generate a final beamformed signal.

9. The method of claim 8, wherein computing the plurality of linear beamformed signals using the reference RF signal comprises using:
   delay and sum beamforming; and
   a plurality of different phase shifts.

10. The method of claim 8, wherein determining the frequency content for each of the plurality of linear beamformed signals comprises:
    performing FFT; or
    performing fast integral transforms.

11. The method of claim 8, wherein determining the reduced subset of linear beamformed signals from the plurality of linear beamformed signals comprises using a neural network.

12. The method of claim 11, wherein the neural network comprises:
    a plurality of fully-connected layers; and
    a plurality of nonlinear activation functions.

13. The method of claim 11, wherein an amount of signals in the reduced subset of linear beamformed signals is a hyperparameter in the neural network.

14. The method of claim 8, wherein applying the learned polynomial response to the amplitude mask ratio to create the modified amplitude mask comprises using a neural network.

15. One or more computer-readable non-transitory storage media embodying instructions that, when executed by a processor, cause the processor to perform operations comprising:
    receiving a reference radio frequency (RF) signal;
    computing a plurality of linear beamformed signals using the reference RF signal;
    determining a frequency content for each of the plurality of linear beamformed signals;
    determining a reduced subset of linear beamformed signals from the plurality of linear beamformed signals;
    computing a minimum element-wise magnitude across the reduced subset of linear beamformed signals;
    computing a fast Fourier transform (FFT) of a reference channel signal;
    computing an amplitude mask ratio between the minimum element-wise magnitude and the FFT of the reference channel signal;
    applying a learned polynomial response to the amplitude mask ratio to create a modified amplitude mask;
    applying the modified amplitude mask to the FFT of the reference channel signal to create a masked frequency response of the reference channel signal; and
    computing an inverse FFT of the masked frequency response of the reference channel signal to generate a final beamformed signal.

16. The one or more computer-readable non-transitory storage media of claim 15, wherein computing the plurality of linear beamformed signals using the reference RF signal comprises using:
    delay and sum beamforming; and
    a plurality of different phase shifts.

17. The one or more computer-readable non-transitory storage media of claim 15, wherein determining the frequency content for each of the plurality of linear beamformed signals comprises:
    performing FFT; or performing fast integral transforms.

18. The one or more computer-readable non-transitory storage media of claim 15, wherein determining the reduced subset of linear beamformed signals from the plurality of linear beamformed signals comprises using a neural network.

19. The one or more computer-readable non-transitory storage media of claim 18, wherein the neural network comprises:
    a plurality of fully-connected layers; and
    a plurality of nonlinear activation functions.

20. The one or more computer-readable non-transitory storage media of claim 18, wherein an amount of signals in the reduced subset of linear beamformed signals is a hyperparameter in the neural network.

* * * * *